United States Patent [19]

Sakamoto

[11] Patent Number: 4,688,174
[45] Date of Patent: Aug. 18, 1987

[54] ELECTRONIC CASH REGISTER

[75] Inventor: Nobuyoshi Sakamoto, Nagaokakyo, Japan

[73] Assignee: Omron Tateisi Electronics Co., Kyoto, Japan

[21] Appl. No.: 597,548

[22] Filed: Apr. 6, 1984

[30] Foreign Application Priority Data

Apr. 27, 1983 [JP] Japan ................................. 58-75503

[51] Int. Cl.4 .......................... G07G 1/12; G06C 7/02
[52] U.S. Cl. ................................... 364/405; 364/200;
364/900; 364/709; 235/145 R
[58] Field of Search .............. 364/405, 200 MS File,
364/900 MS File, 709; 235/145 R

[56] References Cited

U.S. PATENT DOCUMENTS

| 3,946,220 | 3/1976 | Brobeck et al. | 364/405 |
|---|---|---|---|
| 4,107,784 | 8/1978 | Van Bemmelen | 364/900 |
| 4,163,138 | 7/1979 | Harden | 200/5 A |
| 4,200,913 | 4/1980 | Kuhar et al. | 364/900 |
| 4,220,991 | 9/1980 | Hamano et al. | 364/900 X |
| 4,454,596 | 6/1984 | Wunsch et al. | 364/900 |

FOREIGN PATENT DOCUMENTS 00112671 8/1980 Japan ................................. 364/405

OTHER PUBLICATIONS

HP-41C, Owner's Handbook and Programming Guide, 8-79, pp. 59-65.
Prokey (Reg. TM), User's Guide and Literature, 2-83 (1982 copyright).

Primary Examiner—Jerry Smith
Assistant Examiner—Charles B. Meyer
Attorney, Agent, or Firm—Schwartz, Jeffery, Schwaab, Mack, Blumenthal & Evans

[57] ABSTRACT

An electronic cash register having a plurality of keys arranged on a key board can provide optionally predetermined key functions to the plurality of keys. The cash register comprises an indicator for successively indicating designations of keys at least necessary for setting key positions. When the key designations are indicated on the indicator, optional keys on a key board are actuated, and then, key codes of the actuated keys are set as key codes corresponding to function codes of the indicated key designations, so that keys at least necessary for setting key positions are set. Thereafter, function codes corresponding to key codes of the respective keys are set by using the set keys.

5 Claims, 14 Drawing Figures

FIG.3

| INDICATION | KEY DEPRESSED UPON INDICATION |
|---|---|
| 0 | K 50 |
| 1 | K 51 |
| 2 | K 44 |
| 3 | K 37 |
| ⋮ | ⋮ |
| 9 | K 39 |
| CLR | K 54 |
| @ | K 47 |
| VLD | K 77 |
| NS | K 70 |

| KEY CODE | KEY DESIGNATION | FUNCTION CODE |
|---|---|---|
| K 50 | 0 | 40 |
| K 51 | 1 | 41 |
| K 44 | 2 | 42 |
| K 37 | 3 | 43 |
|  | 4 | 44 |
|  | 5 | 45 |
|  | 6 | 46 |
|  | 7 | 47 |
|  | 8 | 48 |
|  | 9 | 49 |
|  | CLR | 50 |
| K 47 | @ | 60 |
| K 77 | VLD | 70 |
| K 70 | NS | 80 |

| 10 | CASH |
|----|------|
| 11 | SUBTOTAL |
| 12 | MISC |
| 13 | CHECK |
| 14 | PICK UP |
| 15 | CHARGE |
| 20 | DEPARTMENT |
| 21 | PLU |
| 30 | 0 0 KEY |
| 31 | · KEY |
| 32 | ERROR CORRECT |
| 31 | REFUND |
| 34 | GENERAL REFUND |

FIG.9

| 01 | @ | 20 | K 74 |
|----|---|----|------|
| 10 | K 22 | 20 | K 75 |
| 11 | K 23 | 30 | K 43 |
| 13 | K 24 | 31 | K 36 |
| 15 | K 25 | 32 | K 40 |
| 20 | K 71 | 33 | K 27 |
| 20 | K 72 |    | NS |
| 20 | K 73 |    |    |

| FUNCTION CODE | KEY CODE |
|---|---|
| | K 1 |
| | K 2 |
| | K 3 |
| ⋮ | ⋮ |
| 10 | K 22 |
| 11 | K 23 |
| 13 | K 24 |
| ⋮ | ⋮ |
| 20 | K 71 |
| 20 | K 72 |
| 20 | K 73 |
| ⋮ | ⋮ |
| | K 77 |

34

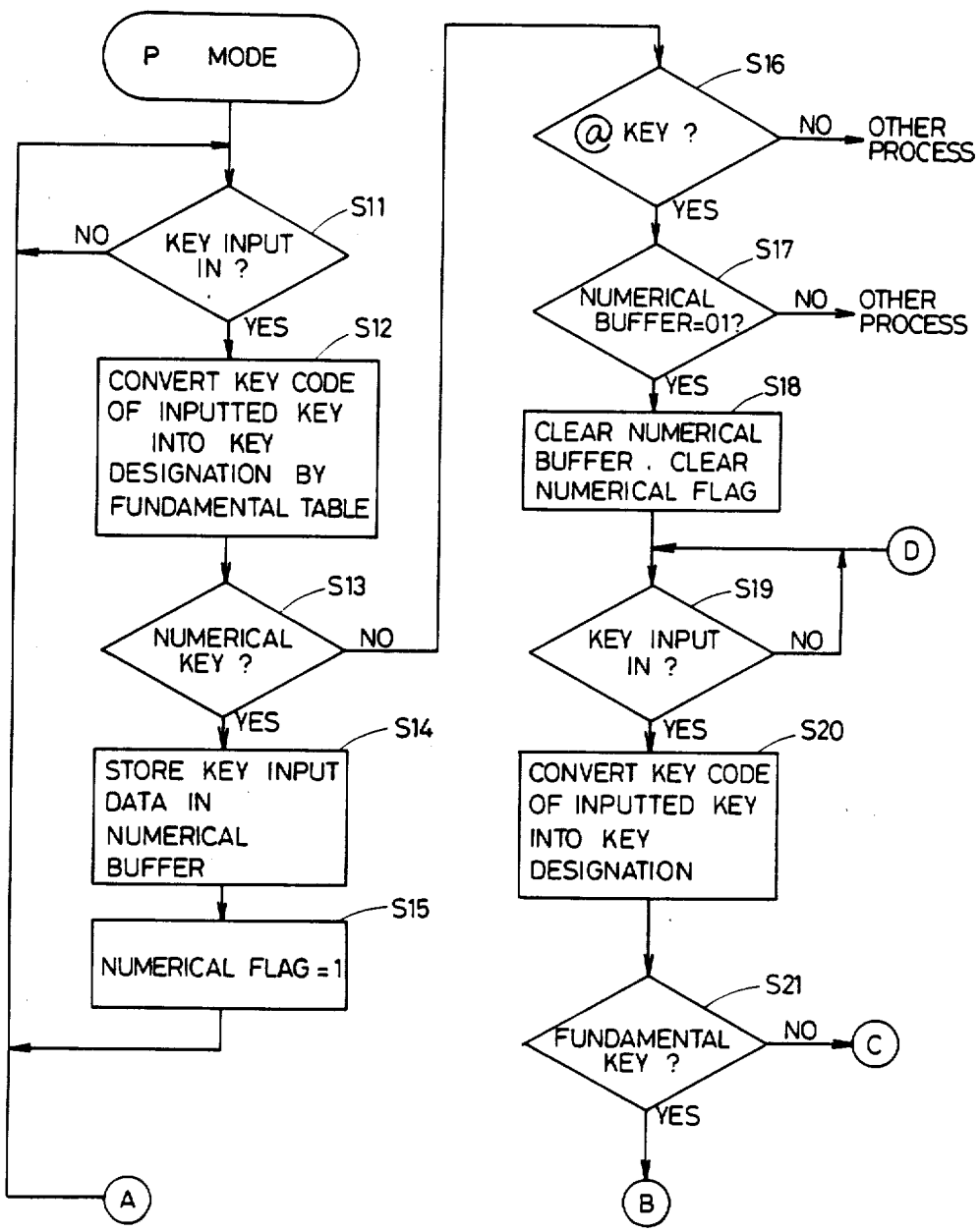
FIG. 12-a

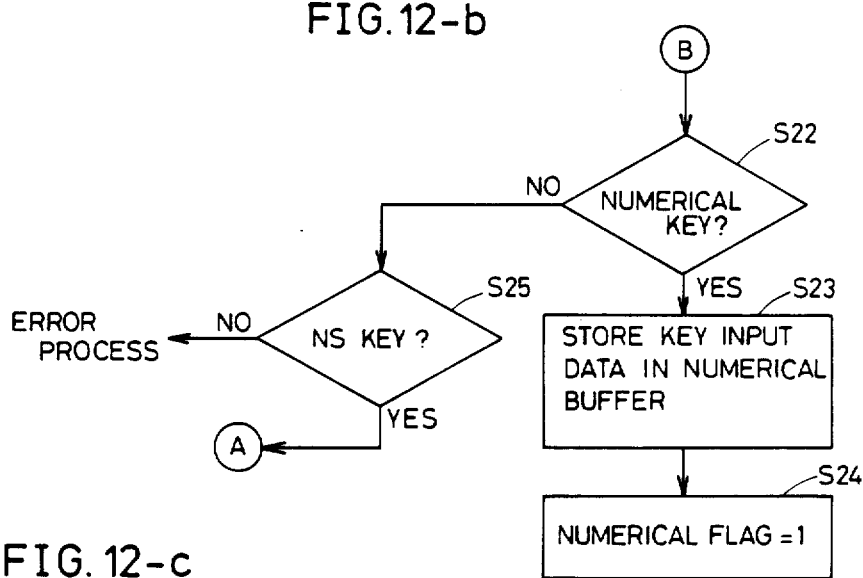
FIG. 12-b
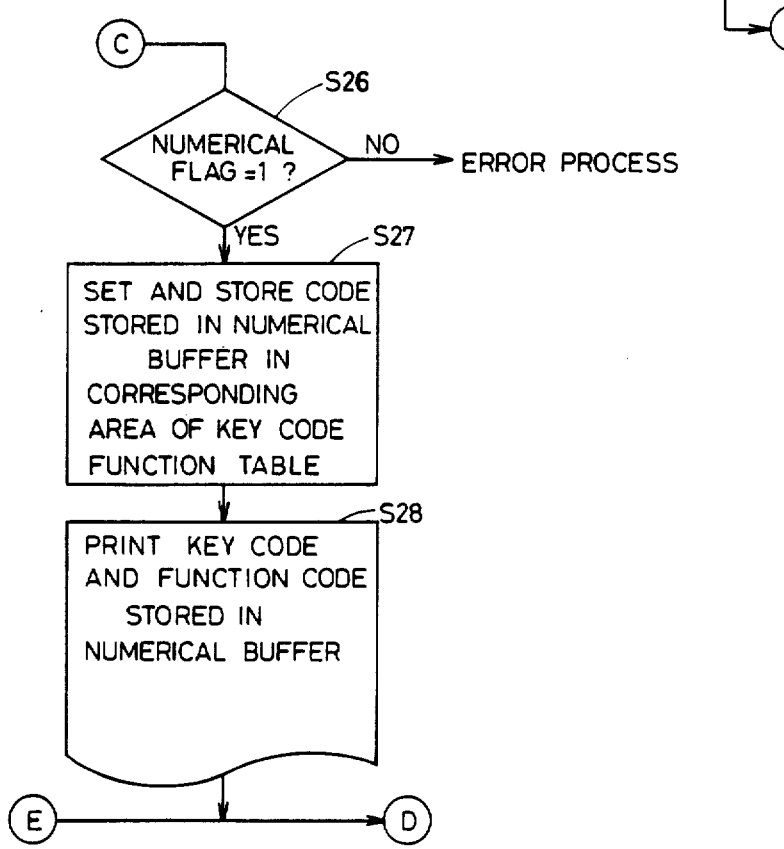
FIG. 12-c

ELECTRONIC CASH REGISTER

BACKGROUND OF THE INVENTION

1. Field of the Invention

The present invention relates to an electronic cash register, and more particularly, it relates to an electronic cash register in which positions of respective keys arranged on a keyboard can be set optionally.

2. Description of the Related Art

In the field of an electronic cash register (hereinafter referred to as ECR), there has generally been provided ones in which positions of respective keys arranged on keyboards can be optionally set to some extent. However, even in such an ECR having key position setting function, keys required at least for use in setting of key positions (fundamental keys) are generally set in a fixed manner in predetermined positions on the keyboard. In other words, fundamental keys such as ten keys for inputting data representing key positions and clear keys for clearing the inputted data have been arranged in previously fixed positions. Thus, with utilization of the fundamental keys, positions of further required keys such as PLU keys and department keys can be set optionally.

Therefore, although keys can be set at desired positions in a conventional ECR, the range of selection has been relatively restricted. Thus, if positions of the keys, including the fundamental keys required at least for use in setting of the key positions, are to be changed, a program in the ECR must be changed or hardware of the keyboard must be changed in such a manner that fixed keys produce codes identical to those before changing, leading to increase in cost of the ECR and complicated operation with respect to the subject change.

SUMMARY OF THE INVENTION

Accordingly, an object of the present invention is to provide an ECR which can set keys, including fundamental keys, previously fixed in a conventional ECR, required at least for setting positions of keys, at desired positions.

An electronic cash register in accordance with the present invention comprises key inputting means having a plurality of keys arranged on a key board of the cash register, first storing means for storing first information representing first group of functions to be performed by a first group of any keys out of the plurality of keys, second storing means for storing second information identifying functions to be performed by a second group of any keys out of the plurality of keys, and first means for reading out the first function representing information from said first storing means for providing to the first group of any keys the first function represented by the first information read out from the first storing means. The second function identifying information is specified by operation of the first group of keys to which the functions represented by the first information read out from the first storing means have been provided by the first means. The cash register further includes second means for providing to the second group of keys the second functions identified by the second information, by using the first group of function-provided keys.

Since the present invention is structured in the aforementioned manner, even keys which have been conventionally arranged in fixed positions can be set at desired positions, thereby enabling provision of an ECR which can satisfy various requirements from customers.

Further, if a customer has a demand for changing the key positions, setting of the key positions can be freely changed without necessity for change of hardware of the keyboard or the program in the ECR in response thereto.

The above features of the present invention will be more clearly understood from the description of the preferred embodiment hereafter made with reference to the accompanying drawings.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is illustrative of key sequences for setting fundamental keys;

FIG. 4 is an explanatory diagram showing a fundamental key table;

FIG. 8 is an illustration showing storage regions in which function codes and designations corresponding to the function codes are stored;

FIG. 9 is an illustration showing key sequences for setting positions of keys other than the fundamental keys;

FIG. 12 is a flow chart for explaining operation for setting positions of keys other than the fundamental keys.

DETAILED DESCRIPTION OF THE PREFERRED EMBODIMENTS

Figure 1:
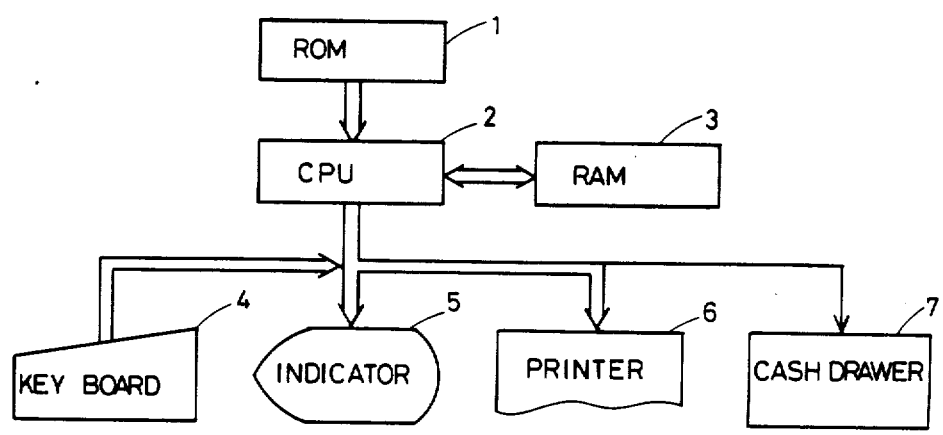
FIG. 1 is a block diagram schematically showing a structure of an embodiment of the present invention.

FIG. 1 is a schematic block diagram of an embodiment of the present invention. The construction of the embodiment of the present invention is described with reference to FIG. 1. A ROM 1 is connected to a CPU (central processing unit) 2 functioning as control means, which CPU 2 in turn performs, based on a program stored in the ROM 1, the operations necessary to function as an ECR. A random access memory (RAM) 3 constitutes a fundamental key table and a key code function table, and includes storage regions shown in FIGS. 4 and 8 as hereinafter described. Further, the CPU 2 is connected to a keyboard 4, an indicator 5, a printer 6, a cash drawer 7, etc.

Figure 2:
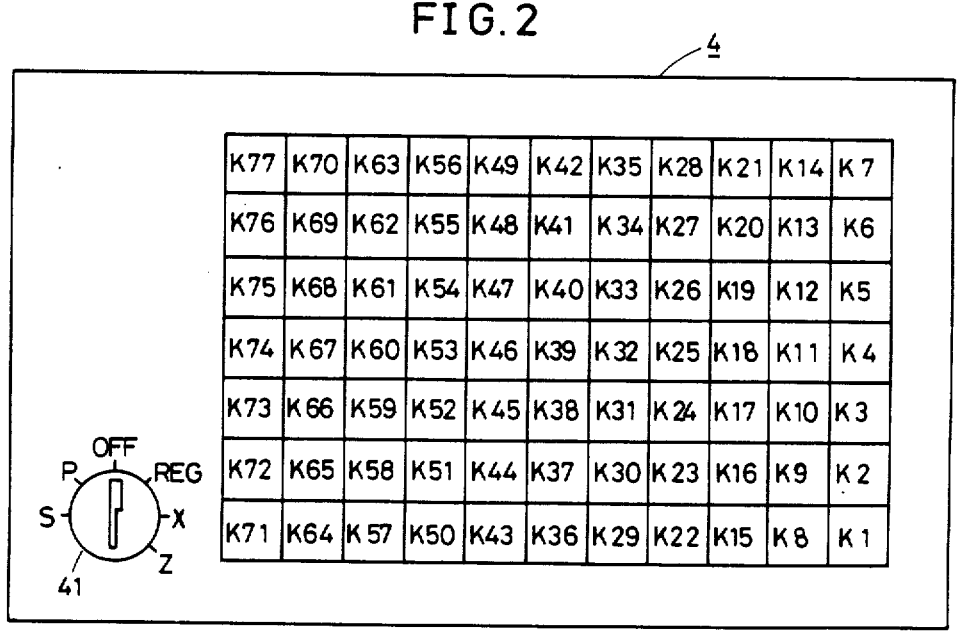
FIG. 2 is an external plan view of a keyboard, shown in a condition in which key positions are not in the least set.

FIG. 2 is an external plan view of the keyboard 4 as shown in FIG. 1. In FIG. 2, the keyboard 4 includes a mode selection switch 41 and keys having key codes K1-K77. The mode selection switch 41 functions to select modes such as a fundamental key setting mode (S mode), a preset mode (P mode) for setting function codes and performing other preset operation, a registration mode (REG mode), an inspection mode (X mode) and an adjustment mode (Z mode). Functions of the respective keys having the key codes K1-K77 are not yet set in the condition of FIG. 2, and the functions are determined according to key position setting operation as hereinafter described.

FIG. 3 is illustrative of key sequence showing the setting operation of keys at least necessary for setting key positions, i.e., fundamental keys. In FIG. 3, for example, indication "0" of a key designation on the indicator 5 (FIG. 1) represents operation or actuation of a key "K50". In a similar manner, indication "1" represents the key "K51", indication "2" represents the key "K44", . . . and indication "NS" represents the key "K70". Thus, the keys to which an operator or user wishes to provide fundamental functions are depressed in response to indications on the indicator, so that the depressed keys are associated with the fundamental function.

Figure 5:
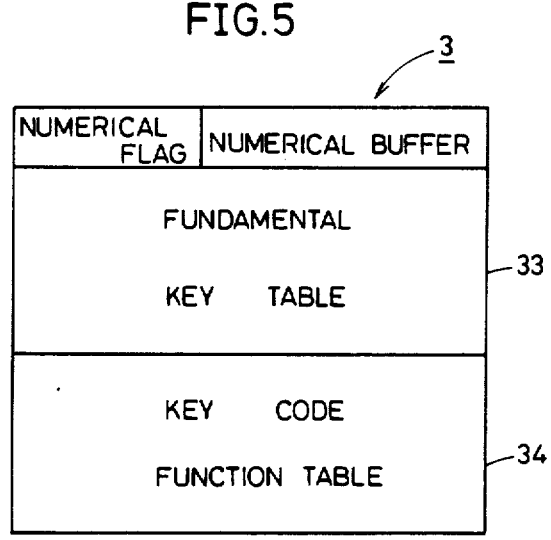
FIG. 5 is an illustration showing storage regions of a RAM 3.

FIG. 4 is illustrative of formation of a fundamental key table 33. The fundamental key table 33 is included in the RAM 3 (FIG. 1) as hereinabove described. The arrangement of the storage regions of the RAM 3 is shown in FIG. 5.

In FIG. 4, the fundamental key table 33 stores function codes which are predetermined in correspondence to key designations. For example, "40" is stored as a function code corresponding to a key designation "0", a function code "41" is stored for a key designation "1", and so forth. Further, the fundamental key table 33 has areas 331 for storing key codes in correspondence to both of the key designations and the function codes. The key code storage areas 331 successively store the key codes corresponding to the key designations and the function codes. The storage of the key codes is performed according to the aforementioned key sequence as shown in FIG. 3. For example, when the key designation "0" is indicated on the indicator, the key "K50" is operated or depressed. Accordingly, the key code "K50" of the operated key K50 is set and stored in the area corresponding to the key designation "0". Thus, in the fundamental key table 33, the key code, e.g., "K50", the key designation "0" and the function code "40" are set and stored in a correlated manner.

Figure 6:
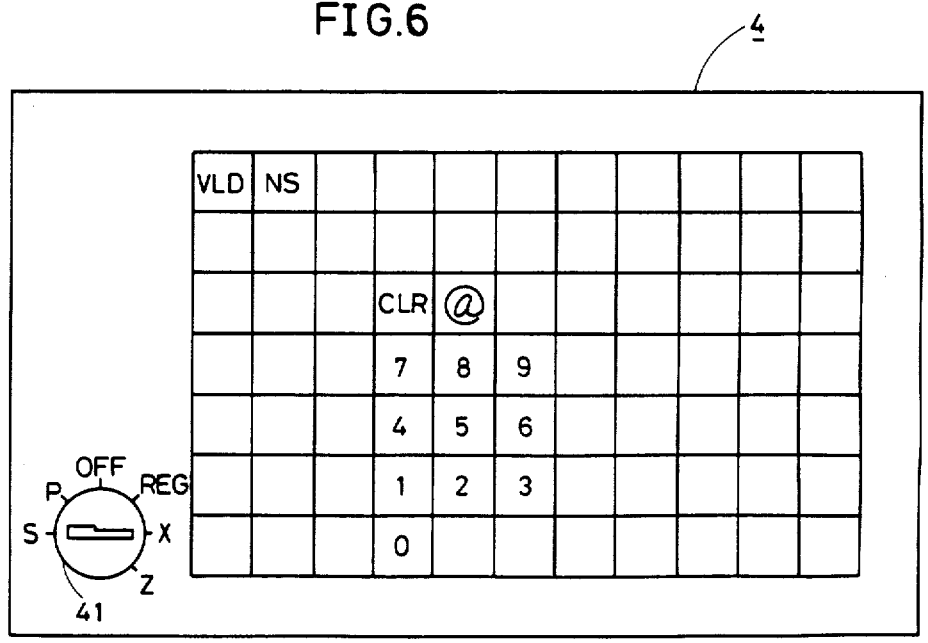
FIG. 6 is an external plan view of the keyboard shown in a condition in which fundamental keys are set.

FIG. 6 is an external plan view of the keyboard 4, showing a condition in which the fundamental keys are set in a manner described in the foregoing.

Figure 7:
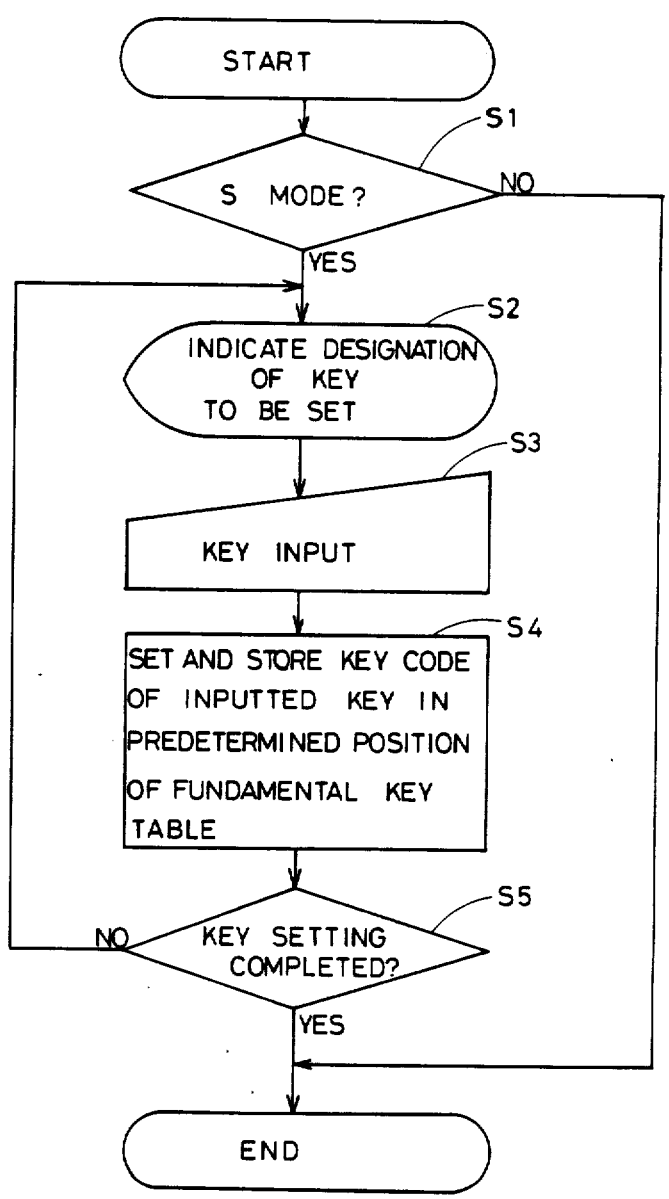
FIG. 7 is a flow chart showing setting operation of the fundamental keys.

FIG. 7 is a flow chart for explaining the operation for setting the fundamental keys. The fundamental key setting operation is now described with reference to FIGS. 1 to 7.

First, a determination is made as to whether or not the mode selection switch 41 on the keyboard 4 is switched to the S mode (step S1). That is, since the S mode is the fundamental key setting mode for setting the fundamental keys, the operation cannot be advanced to the next step unless the mode is set in this mode. If the S mode is set, the CPU 2 indicates the designation of the fundamental key to be set on the indicator 5 (step S2). For example, it indicates the designation "0" of the fundamental key to be set.

In response to the indication of the key designation, a key selected from the keys K1-K77 provided on the keyboard 4 is operated. That is, a key desired to be used in the key designation "0" is optionally selected from the 77 keys K1-K77. It is assumed here, for example, that the key K50 is operated. Then, the key code "K50" of the operated key K50 is stored in the key code area of the fundamental key table (FIG. 4) corresponding to the key designation "0" (step S4). Thereafter, at step S 5, the CPU 2 determines whether or not the setting of the key is completed, and if the setting is not completed, the operation at the steps S2 to S5 is repeated. By virtue of this, a desired key is selected, in response to the designation of the fundamental key successively indicated on the indicator 5, from the respective keys K1-K77, such that the selected key functions as the fundamental key corresponding to the successively indicated key designation.

FIG. 6 shows the keyboard in which the fundamental keys are set in the above manner. In FIG. 6, the respective keys whose key designations are not recorded are keys whose functions are not yet determined.

The keys at least necessary for setting the key positions, i.e., the fundamental keys have been determined in the aforementioned manner. Next, description is made with respect to setting operation of positions of other keys required in the ECR utilizing the fundamental keys.

FIG. 8 is an explanatory diagram of a memory location in which the function codes and the key designations or key functions corresponding to the function codes are stored. This memory is stored in, e.g., the ROM 1 (FIG. 1).

FIG. 9 shows key sequences for setting positions of other keys of the ECR utilizing the fundamental keys. In the present embodiment, "01" is pushed by numerical keys included in the fundamental keys and a "@" key in the fundamental keys is pushed thereby to start setting operation of the key positions. Then, the function code corresponding to a predetermined key designation is inputted. For example, when a function code "10" corresponding to the key designation or key function "CASH" is inputted from the numerical keys and then the "K22" key is pushed, the key K22 is determined as a "CASH" key. In a similar manner, positions of the keys required for the ECR are set. And, lastly the "NS" key representing completion of the setting of the key positions is operated.

Figures 10, 11:
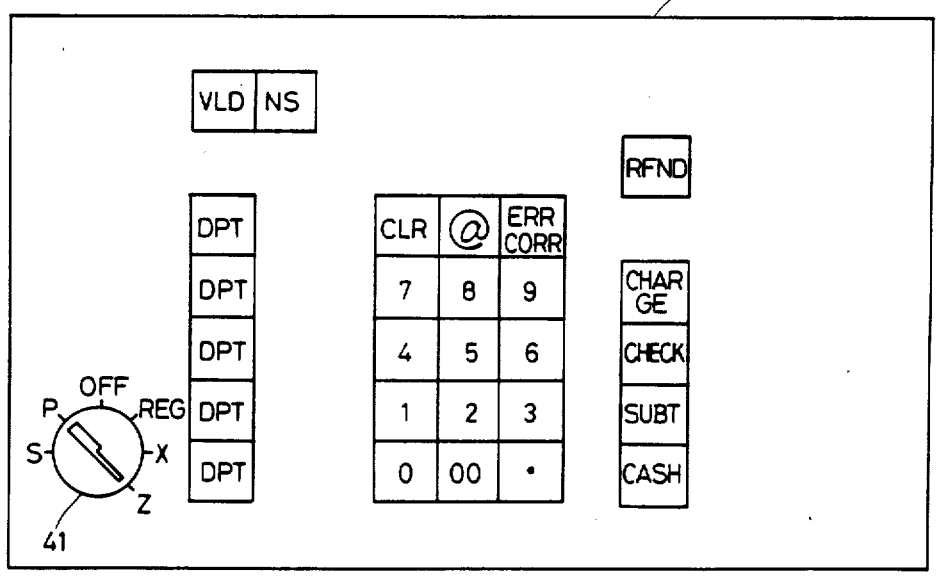
FIG. 10 is an explanatory diagram of a key code function table.
FIG. 11 is an illustration showing the keyboard in which all of the key positions are set.

FIG. 10 is an explanatory diagram showing a key code function table. The key code function table has areas for storing function codes in correspondence to the key codes of the respective keys K1-K77. When the keys are operated in accordance with the key sequence of FIG. 9, the function codes are stored in predetermined areas of the key code function table. For example, in FIG. 9, when the key operation "10"-"K22" is performed, "10" is stored in an area of the function code of the key code function table corresponding to the key code K22. Thus, the function codes are stored in the predetermined function code areas. Therefore, the function codes are not stored with respect to all of the key codes K1-K77 in the key code function table, but the function codes are set only with respect to the key codes of the keys whose key positions are desired to be set.

FIG. 11 is an external schematic view of the keyboard of the ECR in which the positions of the keys are finally determined according to the aforementioned operation. It is to be noted that, since the key positions are determined to be set in the preset mode in the present embodiment, the mode selection switch 41 is switched to the P mode.

FIG. 12 is a flow chart showing the operation for setting the positions of other keys utilizing the fundamental keys. Mainly with reference to FIGS. 4, 8, 9, 10 and 12, detailed description is hereafter made with respect to the operation for setting the positions of other keys utilizing the fundamental keys.

The mode selection switch 41 is set in the preset mode. Then, a key input is stood by, and upon the key input, the key code of the inputted key is converted into the key designation by the fundamental key table 33. For example, if the inputted key is "K50", the CPU 2 reads from the fundamental key table the function code "40" corresponding to the key code "K50" of the inputted key K50. Then the CPU 2 reads the key designation "0" represented by the function code "40".

The CPU 2 determines whether or not the read key designation shows a numerical key, and in case of the numerical key, the CPU 2 stores numerical data represented by the numerical key in a numerical buffer of the RAM 3. Then, the CPU 2 sets a numerical flag (steps S11-S15). When such operation is repeated twice, a number, e.g., "01" as shown in FIG. 9 is inputted.

Thereafter a determination is made as to whether or not the operated key is the "@" key, and in case of the "@" key, the CPU 2 determines whether or not the numerical data stored in the numerical buffer is "01". This operation is performed for a determination as to whether or not a command has been made to start the key position setting operation (steps S16 and S17).

When the command for the key position setting is made, the numerical buffer and the numerical flag are cleared at the step S18, thereby to stand by a key input (step S19).

Upon the key input, the function code corresponding to the key code is read based on the fundamental key table 33 (FIG. 4), thereby to read the key designation based on the subject function code. In other words, the key code of the inputted key is converted by the fundamental key table into the key designation. If the inputted key is a numerical key selected from the fundamental keys, the numerical data thereof is stored in the numerical buffer, thereby setting the numerical flag (steps S20-S24). This operation is performed in correspondence to input operation of, e.g., "10" as shown in FIG. 9.

Then, upon actuation of the key "K22", the process is advanced from the step S21 to a step S26 since the key "K22" is not a fundamental key. Thereafter a determination is made as to whether or not a numerical flag is set. It means that, a determination is made as to whether or not a predetermined numerical data, i.e., a function code to be stored in the function code storage area of the key code function table 34 (FIG. 10) is inputted in advance to the operation of the key "K22" which is not the fundamental key. If normal operation is performed, the numerical flag is set. In this case, the CPU 2 sets the numerical data stored in the numerical buffer, e.g., "10" in the corresponding area of the key code function table 34. The corresponding area in this case is the function code storage area corresponding to the key code "K22". Thereby the function code "10" corresponding to the key K22 is stored, and since the function code "10" represents "CASH" (refer to FIG. 8), the key K22 is located as the "CASH" key.

Then, with printing of the key code and the function code stored in the numerical buffer, the sequential operation is completed (step S28).

By repeating the aforementioned sequential operation, the positions of the "CASH" key, a "DPT" key etc. are determined.

Upon completion of the key position setting operation, the "NS" key is lastly pushed. By virtue of this, the key position setting operation is completed.

In the aforementioned embodiment, the fundamental keys have been set in the S mode while the positions of other keys required for the ECR have been set utilizing the set fundamental keys in the present mode (P mode). However, the setting modes are not limited to the aforementioned modes, and the operation can be programmed to be performed in another modes. For example, setting of the fundamental keys may be started simultaneously with turning-on of the main power supply for the ECR.

It is to be noted that the ECR of the present embodiment operates with respect to key operation in normal use as follows: Upon a key input, the CPU 2 first searches the fundamental key table 33 (FIG. 4) based on the inputted key code. Then, if the inputted key code is in the fundamental key table 33, it reads the function code and the key designation corresponding thereto, and if not, it reads from the key code function table (FIG. 10) the function code corresponding to the key code. The CPU 2 performs the operation thereafter based on the respective function codes, etc. More particularly, in the register mode, a key code is identified in response to depression of a key set or determined as registering function key, and then a corresponding function code is identified, so that corresponding registering function is made.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register comprising:
   key inputting means having a plurality of keys arranged on a keyboard of the cash register;
   first storing means for storing first information representing a first group of functions to be performed by a first group of any keys out of the said plurality of keys;
   second storing means for storing second information identifying functions to be performed by a second group of any keys out of said plurality of keys;
   reading means for reading out said first function representing information from said first storing means;
   indicating means responsive to the first information read out from the first storing means for sequentially indicating to an operator the first function represented by the first information;
   mode selecting means for selecting one of a first mode for assigning said first group of functions to the first group of any keys and a second mode for assigning said second functions to the second group of keys;
   first means responsive to the selection of said first mode by said mode selecting means for assigning to the first group of keys the first functions indicated by the indicating means;
   said second function identifying information being specified by operation of said first group of keys to which the functions represented by the first information read out from the first storing means have been assigned by said first means; and second means responsive to the selection of said second mode by said mode selecting means for assigning to the second group of keys the second functions identified by the second information by actuation of the first group of function-assigned keys.

2. An electronic cash register in accordance with claim 1, wherein
said first group of functions comprises fundamental key functions, such as numeral key functions, which are at least necessary for providing predetermined functions to said plurality of keys, and
said second group of functions comprises other predetermined key functions.

3. An electronic cash register in accordance with claim 2 wherein
said indicating means includes displaying means responsive to selection of the first mode by said mode selecting means for displaying the first information stored in said first storing means, and
wherein said cash register further includes third storing mean responsive to the information displayed by said displaying means for operating any key to which the fundamental function is to be provided and for storing, associated with said displayed information, key identifying information corresponding to the operated key, and
said second means further includes fourth storing means for storing, in an associated manner, a function identifying code for identifying said other key function, which is inputted by said fundamental key function-provided keys and a key identifying code for identifying the key to which the other function is to be provided.

4. An electronic cash register in accordance with claim 3, wherein
said first mode is selected in response to switching on of a power supply for a cash register.

5. An electronic cash register in accordance with claim 3, wherein
said second mode is selected by a preset mode of the electronic cash register.

* * * * *